United States Patent Office 3,558,732
Patented Jan. 26, 1971

3,558,732
AROMATIC HYDROCARBON SEPARATION
BY ADSORPTION
Richard W. Neuzil, Downers Grove, Ill., assignor to Universal Oil Products Company, Des Plaines, Ill., a corporation of Delaware
No Drawing. Continuation-in-part of application Ser. No. 739,176, June 24, 1968. This application May 12, 1969, Ser. No. 823,932
Int. Cl. C07c 7/12; C10g 25/04
U.S. Cl. 260—674                                       14 Claims

ABSTRACT OF THE DISCLOSURE

An improved adsorptive-separation process for separating at least one $C_8$ aromatic isomer from a hydrocarbon feed containing a mixture of $C_8$ aromatic isomers which process employs a crystalline aluminosilicate adsorbent to selectively adsorb one $C_8$ aromatic isomer from the feed. The improvement basically comprises employing toluene as a desorbent to increase the selectivity of the crystalline aluminosilicate thereby allowing a more efficient separation with higher purity extract streams.

CROSS-REFERENCE TO RELATED APPLICATIONS

This application is a continuation-in-part application of co-pending application Ser. No. 739,176 filed June 24, 1968, all the teachings of said co-pending application are incorporated herein by specific reference thereto.

BACKGROUND OF THE INVENTION

Field of the invention

The field of art to which the claimed invention pertains is hydrocarbon separation. More specifically, the claimed invention relates to the separation of $C_8$ aromatic hydrocarbons by incorporating a solid crystalline aluminosilicate adsorbent which selectively removes at least one aromatic component from the feed. The selectively adsorbed aromatic component is recovered from the adsorbent through a desorption step.

Description of the prior art

It is known in the separation art that certain adsorbents generally comprising crystalline aluminosilicates can be utilized to separate certain hydrocarbons from mixtures thereof. In aromatic hydrocarbon separation and in particular the separation of $C_8$ aromatic isomers, it is generally recognized that certain crystalline aluminosilicates containing selected cations at the zeolitic cationic sites enhance the selectivity of the zeolite for a given $C_8$ aromatic isomer.

In selecting a desorbent for use in a $C_8$ aromatic isomer separation process, it is necessary that the desorbent be able to displace the selectively adsorbed $C_8$ isomer from the feed so that the selectively adsorbed isomer can be recovered from the adsorbent and thereafter separated from the desorbent as a relatively rich product. In certain adsorptive-separation processes, the selectivity retained component of the feed can be recovered in a desorption step in which the adsorbent is contacted with a gas at elevated temperature or reduced pressure or both a gas at elevated temperature and reduced pressure to effect the desorption of the adsorbed material. However, in certain type operations in which relatively isothermal and isobaric conditions are employed to effect the adsorption and subsequent recovery of a particular feed component, the desorption step is generally carried out by using a desorbent material which can physically displace the adsorbed feed component from the adsorbent.

In $C_8$ aromatic separation processes in which the displacement technique is used to recover a selectively adsorbed feed component from a feed mixture, the desorbent material must be able to relatively easily displace adsorbed feed hydrocarbons while also being able to be displaced by the selectively adsorbed component of the feed so that the adsorbent may be continuously used. Generally, the hydrocarbons which are selected for use as desorbent materials, when xylenes are to be separated, include the aromatic type hydrocarbons because they are able to displace the alkyl aromatic xylene isomers from zeolitic type adsorbents. Paraffins and naphthenes in most cases are not able to desorb adsorbed xylene isomers from the zeolite adsorbents, and are generally not employed as desorbents.

The type X and Y zeolite adsorbents behave in a manner similar to other zeolitic adsorbents by exhibiting reduced selectivities at increased operating temperatures while exhibiting increased adsorption and desorption rates at the higher operating temperatures. In order to effectively be able to separate a given xylene isomer from a feed containing a mixture of isomers, it is required that an optimum temperature be selected to both allow a reasonable efficient separation in a necessarily reasonable length of time. The aromatic desorbent material must be easily separable from the feed stock so that a relatively high purity extract product can be produced.

Benzene or toluene are generally employed as desorbent material since they are readily available, easily separated from any of the $C_8$ aromatic isomers and do not require unnecessarily increased operating temperatures to attain reasonable rates of exchange of desorbent material into and out of the zeolite adsorbent.

It is generally recognized that higher molecular weight materials are not adsorbed and desorbed from zeolite adsorbents at the same rate as lower molecular weight materials. Therefore, a higher operating temperature is imposed on the separation process when higher molecular weight materials must be adsorbed to increase the rate of adsorption and desorption. Elimination of relatively increased operating temperatures can be accomplished by employing desorbents which are lower in molecular weight than the feed mixture molecular weight. Consequently, benzene and toluene are the logical choice for efficient separation to occur.

I have found that in adsorptive separation processes in which a solid zeolitic adsorbent must simultaneously contact both desorbent and feed streams under circumstances allowing competitive adsorption between desorbent and the selectively adsorbed feed component for the adsorptive sites on the adsorbent, that benzene adversely affects the selectivity of the adsorbent.

The prior art has not recognized the inferiority of benzene as a desorbent in processes in which a portion of desorbent material is in contact with and surrounding the adsorbent during adsorption of a selected feed component. The general consensus has been that benzene and toluene are generally equivalent in their capacities as desorbents. Benzene and toluene are substantially equivalent in their desorption characteristics in adsorptive-separation processes generally characterized as equilibrium adsorption type operation. The equilibrium-adsorption operations essentially take place in a sequence of steps in which a feed stream is passed through a zeolite adsorbent bed until the effluent stream which passes out of the adsorbent after contact herewith is essentially of the same composition as the material fed to the adsorbent bed indicating no net transfer between the adsorbed material within the adsorbent and the feed stock surrounding the adsorbent. A desorbent material, generally benzene or toluene, is then passed through the bed of adsorbent to displace the selectively adsorbed component of the feed. In this type sequential operation, there is generally no period in which there is competitive adsorption of both the desorbent and the selectively adsorbed component of the feed and consequently no indication that benzene adversely effects the selectivity of the adsorbent when benzene is in contact with the adsorbent during adsorption operations.

In continuous simulated or actual countercurrent liquid solid flow systems in which a predetermined component of the feed is continuously and selectively adsorbed from the feed mixture by a solid adsorbent, there are zones in which there is essentially a simultaneously contacting of the adsorbent with a mixture comprising desorbent material and feed material. The occurrence of the feed and desorbent material in admixture creates a condition where there is occurrence of competitive adsorption on the adsorbent of both desorbent material and the selectively adsorbed component of the feed mixture.

In most continuous countercurrent solid fluid flow separation processes, the solid adsorbent contacts the feed mixture in what is generally referred to as an adsorption zone. The feed and solid adsorbent countercurrently contact each other with the adsorbent passing out of the adsorption zone containing primarily the selectively adsorbed component of the feed within the solid adsorbent. The solid adsorbent which contains the selectively adsorbed component of the feed continues to countercurrently contact liquid material flowing by the solid adsorbent and eventually is contacted with desorbent material in a desorption zone. The desorbent material displaces the selectively adsorbed component of the feed from the solid adsorbent and allows a mixture of desorbent and the selectively adsorbed component of the feed to be removed from the process as an extract stream, which eventually passes to a separation means wherein the desorbent material is separated from the selectively adsorbed component of the feed thereby giving an enriched stream of the selectively adsorbed component of the feed. The solid adsorbent, after being contacted with the desorbent in the desorption zone, continues to flow in a countercurrent direction in relation to the fluid flow in the system and eventually is contacted with the feed once again for adsorption of the selectively adsorbed component of the feed into the solid adsorbent. Between the adsorption zone and the desorption zone are located fluishing or rectification zones which, by carefully controlled pressure drops and liquid flow, prevent the raffinate and extract streams from contaminating each other. The material contained in the flushing or rectification zones generally comprises desorbent material.

The desorbent in the flushing or rectification zones located between the adsorption zone and the desorption zone flushes any raffinate material carried by the solid adsorbent back into the adsorption zone and eventually ends up contacting the adsorbent in the adsorption zone at substantialy the same time that the feed mixture contacts the solid adsorbent in the adsorption zone. The desorbent which contacts the adsorbent in the adsorption zone causes competitive adsorption between it and the selectively adsorbed component of the feed and can affect the selectivity of the adsorbent for the required separation. I, therefore, have found that by employing toluene as a desorbent in a separation process in which desorbent is present while adsorption of a feed component takes place that improved separations are obtained.

SUMMARY

It is an object of the improvement of this invention to employ a toluene desorbent to improve the performance of an adsorbent in a process in which desorbent material and feed material both contact an adsorbent during adsorption conditions.

Adsorption or retention of one or more components of a hydrocarbon feed mixture by a solid adsorbent as defined in this specification shall include the physical holding of a component by the adsorbent by the physical inclusion of a component within the adsorbent because of its physical size or structure or chemisorption of the component within the adsorbent by electrostatic forces.

In adsorptive-separation processes, an important factor used to determine the ability of a particular adsorbent to separate components of a feed is the selectivity (B) of the adsorbent for one component as compared to another component. The selectivity used throughout this specification for two given components is defined as the ratio of the concentration of the two components the adsorbed or retained phase within the adsorbent over the ratio of the same two components in the unadsorbed phase at equilibrium conditions. Expressed in equation form, selectivity is shown in Equation 1 below, $$\text{Selectivity} = B_{x/y} = \frac{[\text{Vol. percent } X/\text{Vol. percent } Y]A}{[\text{Vol. percent } X/\text{Vol. percent } Y]U} \quad (1)$$

where X and Y are the two components of the feed represented in vol. percent and the subscripts A and U represent the adsorbed and unadsorbed phases respectively. The equilibrium conditions as defined here are determined when the feed passing over a bed of adsorbent did not change composition after contacting the bed of adsorbent, or in other words, where there was no net transfer of material occurring between the unadsorbed feed and the adsorbed phase.

As can be seen when the selectivity of two components approaches unity there is no preferential adsorption of one component by the adsorbent. As the selectivity becomes less than or greater than unity, there is a preferential selectivity by the adsorbent of one component. When comparing the selectivity of the component X over component Y, a selectivity larger than unity indicates preferential adsorption of component X within the adsorbent while a selectivity less than unity would indicate that component Y is preferentially adsorbed leaving an unadsorbed phase richer in component X.

Both the natural and synthetic aluminosilicates may be used as adsorbents in the present invention. A crystalline zeolitic aluminosilicate encompassed by the present invention for use as an adsorbent includes aluminosilicate cage structures in which the alumina and silica tetrahedra are intimately connected with each other in an open three-dimensional crystalline network. The tetrahedra are cross-linked by the sharing of oxygen atoms. The spaces between the tetrahedra are occupied by water molecules prior to dehydration. The dehydration results in crystals interlaced with channels of molecular dimensions. Thus, the crystalline aluminosilicates are often referred to as molecular sieves. In the hydrated form, a crystalline aluminosilicate may be represented by the formula represented in Equation 2, $$M_{2/n}O : Al_2O_3 : wSiO_2 : yH_2O \quad (2)$$

where M is a cation which balances the electrovalence of the tetrahedra and generally referred to as an exchangeable cation, $n$ represents the valence of the cation, $w$ represents the mols of $SiO_2$ and $y$, the mols of water. The cations may be any one of a number of ions such as, for example, the alkali metal ions or the alkaline earth ions or rare earth ions.

Crystalline aluminosilicates which find use as the adsorbent in the process of this invention possess relatively well-defined pore structures. The exact type aluminosilicate is generally referred to by the particular silica-alumina ratio and the pore dimensions of the cage structures. The faujasites are commonly represented as type X and type Y aluminosilicates and are defined by their varying silica to alumina ratios.

The zeolite type X can be represented in terms of mole oxides as represented in the following Equation 3, $$0.9 \pm 0.2 M_{2/n}O : Al_2O_3 : 2.5 \pm 0.5 SiO_2 : yH_2O \qquad (3)$$

where M represents at least 1 cation having the valence of not more than 3, $n$ represents the valence of M, and $y$ is a value up to about 8 depending upon the identity of M and the degree of hydration of the crystal. Zeolite type X is described in U.S. Pat. No. 2,882,244.

The type Y zeolite may be represented in the terms of the mol ratio of oxides for the sodium form as represented in the following Equation 4, $$0.9 \pm 0.2 Na_2O : Al_2O_3 : wSiO_2 : yH_2O \qquad (4)$$

where $w$ is a value greater than 3 and up to about 8, and $y$ may be a value up to about 9. The type Y zeolite is described in U.S. Pat. No. 3,130,000.

The molecular sieve adsorbents contemplated herein include not only the sodium form of the type Y zeolite but also crystalline materials obtained from such a zeolite by partial or complete replacement of the sodium ions with other individual or groups of cations selected from lithium, potassium, beryllium, magnesium, calcium, strontium, barium, nickel, copper, silver, manganese and cadmium. Similarly, the type X zeolite may be ion exchanged. The exchangeable cationic sites for the type Y zeolite as described in Equation 4 are generally represented by the sodium cations present in the type Y sodium zeolite. Cationic or base exchange methods are generally known to those familiar with the field of crystalline aluminosilicate production and are generally performed by contacting a zeolite with an aqueous solution of soluble salts of the cation or cations desired to be exchanged on the sieve. The desired degree of cation exchange is allowed to take place before the sieves are removed from the aqueous solution and dried to a desired water content. It is contemplated that in cationic exchange operations that the cation exchange may take place using individual solutions of desired cations to be placed on the molecular sieve or using an exchange solution containing mixtures of the cations which are desired to be exchanged onto the crystalline aluminosilicate zeolite.

Equilibrium adsorption conditions as defined herein include operations in which essentially all the desorbent material which is contained within an adsorbent prior to being contacted with a feed stream is displaced from the adsorbent by the subsequent contact with the feed material. This results in an adsorbent which contains essentially no desorbent material after adsorption has taken place. In displacing a desorbent material from an adsorbent, equilibrium adsorption conditions are attained when the fed stream which has contacted the adsorbent bed contains essentially no desorbent material and is of the same composition as the feed passed into the adsorbent bed indicating no net transfer of material into or out of the adsorbent.

Less than equilibrium adsorption conditions are defined as those operations in which desorbent remains within the adsorbent while the feed mixture is being adsorbed within the adsorbent. Less than equilibrium adsorption conditions can generally be achieved by contacting an adsorbent with a feed mixture which contains desorbent material or by contacting an adsorbent which contains desorbent with a desorbent-free feed stream and only displacing a portion of the desorbent from the adsorbent.

I have found that when a hydrocarbon feed stream which contains a quantity of desorbent material is contacted with a molecular sieve adsorbent which adsorption taking place at less than equilibrium adsorption conditions that a toluene desorbent must be used in order to prevent adsorbent selectivities from being substantially reduced.

In adsorptive-separation processes, the basic process steps comprise an adsorption step in which a feed component contacts molecular sieve adsorbent which selectively adsorbs one or more components of the hydrocarbon feed stream, and a desorption step in which a desorbent contacts molecular sieve adsorbent containing the preferably adsorbed component of the feed stream within the adsorbent and displaces these feed components from the adsorbent. The desorbed components of the feed can be collected and separated from desorbent and recovered as a relatively high purity product.

The effects of the correct choice of desorbents is readily noticed in continuous countercurrent simulated moving-bed processes in which less than equilibrium adsorption conditions are present. In these type processes, a continuous production of an extract stream rich in the selectively adsorbed component of the feed and a raffinate stream depleted in the selectively adsorbed component of the feed requires that less than equilibrium adsorption conditions take place. The basic flow scheme for these type processes are disclosed in U.S. Pat. 2,985,589.

In order to reduce the contamination of extract and raffinate streams when employing the general flow patterns disclosed in U.S. Pat. 2,985,589, desorbent material is employed as a flushing or rectification material between the adsorption and desorption zones. In the countercurrent flow process previously described, the solid is first contacted with the feed stream in an adsorption zone after which the solid is removed from the adsorption zone contacting a liquid generally comprising desorbent to remove any raffinate material contained in the adsorbent and contained between the particle adsorbent in a rectification or flushing zone. The solid, after leaving this rectification or flushing zone, then contains substantially no raffinate material adsorbed or contained between the particles of the molecular sieve and is passed into a desorption zone where the adsorbent is contacted with a desorbent material which displaces the selectively adsorbed component of the feed from the molecular sieve and allows recovery of an extract stream comprising desorbent and the selectively adsorbed component of the feed. The solid leaving the desorption zone contains, adsorbed within the molecular sieve and contained between the particles of the molecular sieve, essentially pure desorbent and after leaving the desorption zone passes into a second rectification or flushing zone in which the solid molecular sieve is contacted with a small portion of raffinate material from the next adsorption zone to remove a portion of the desorbent from between the particles of the molecular sieve. The molecular sieve is then passed into an adsorption zone wherein the feed contacts the molecular sieve and the entire cycle of events described above are repeated. In general most countercurrent operations are effected using a series of alternate zones which can extend in a series connection to any practical staged amount. One aspect of the continous countercurrent flow separation process is that the operation in this type flow system is continuous. This means that a set of adsorption and desorption zones with the related rectification or flushing zones are generally stacked in a manner so as to allow a continuous loop of stacked zones allowing a continuous closed loop operation to take effect.

In the countercurrent flow operations there is generally no equilibrium adsorption taking place. This is primarily due to the fact that a quantity of desorbent is generally present within the molecular sieve adsorbent in the adsorption zone during the period of time when feed material is contacting the adsorbent. The feed material is not able to totally remove the desorbent from the solid absorbent located within the adsorption zone and than equilibrium adsorption conditions occur. Consequently, the effects of desorbent material on the selectivity of the adsorbent become pronounced and requires the selection of a desorbent which does not adversely alter the adsorbent's ability to retain a given component of the feed.

The $C_8$ aromatic isomers which can be use in the feed streams for adsorptive separation processes used herein include ortho-, meta-, para-xylene and ethylbenzene. Other materials that may be included in the feed streams but which are not necessarily detrimental to the performance of this adsorptive-separation processes include the paraffins, olefins, naphthenes and other type hydrocarbons which necessarily can be found in $C_8$ aromatic streams.

Adsorption conditons include temperatures within the range of from about 30° C. to about 350° C. and preferably within the range of from about 40° C. to about 250° C. and pressures within the range of from about atmospheric to about 600 p.s.i.g. and preferably within the range of from about atmospheric to about 400 p.s.i.g. Both liquid phase and vapor phase operations can be used in the adsorption step and it is preferable to employ the liquid phase operations because of the reduced temperature requirements and the decreasing opportunities for any type of side reactions to occur in the separation process. Desorption conditions include substantially the same limitations imposed with respect to adsorption conditions.

In testing the various effects of desorbents on the modification of the selectivity of various adsorbents a dynamic testing apparatus was used. The dynamic testing apparatus used to measure the selectivity of the particular adsorbent consisted of a chamber of approximately 40 cc. volume having inlet and outlet ports at opposite ends of the chamber. The chamber was contained within a temperature control heating system and in addition pressure control equipment was used to operate the chamber at a constant predetermined pressure of about 40 p.s.i.g. Attached to the outlet line connected to the outlet of the chamber was chromatographic analysis equipment which was used to analyze the effluent stream leaving the adsorbent chamber. The temperature of the adsorbent chamber and the liquid flowing into and out of the chamber was maintained at about 125° C. and the rate of feed or desorbent flow in the adsorbent chamber was controlled at about 3 liquid hourly space velocity.

The following general procedures were used to determine the data or selectivity for various adsorbents used in the chamber. A feed mixture having a known composition of $C_8$ aromatic isomers diluted in iso-octane (2,2,4-trimethylpentane) was passed through the adsorbent chamber at a regulated pressure temperature and flow rate until the effluent composition flowing from the adsorbent chamber remained at a constant composition indicating that there was no net transfer between the adsorbed phase within the adsorbent in the unadsorbed or external phase surrounding the sorbent particles. The feed to the adsorbent chamber was then stopped. A desorbent material was then passed through the adsorbent chamber to desorb the previously adsorbed component of the feed from the adsorbent. The chromatographic analysis equipment was used to analyze the unadsorbed or external phase and the material desorbed from within the adsorbent when desorbent material was passed through the adsorbent chamber. Knowing the composition of the feed and desorbent streams and the composition of the effluent streams passing out of the adsorbent chamber during desorption operations, the selectivity of a particular adsorbent could then be easily determined. To show the effects of less than equilibrium adsorption conditions when using various desorbents, a quantity of desorbent was mixed in a feed stream and the resultant mixture was then passed into the adsorption chamber containing a selected molecular sieve adsorbent. Flow was maintained into the adsorption chamber until the feed stream containing desorbent and the effluent stream leaving the adsorbent chamber were essentially the same.

By testing various desorbents in equilibrium and less than equilibrium adsorption operations, it was possible to demonstrate the reduced selectivities which occurred when certain desorbents were used in less than equilibrium adsorption conditions although during equilibrium adsorption conditions there was no effective difference in the selectivity shown by a particular molecular sieve adsorbent when various desorbents were used.

In the following examples a type X crystalline aluminosilicate adsorbent was used which contained barium and potassium cations of the exchangeable cationic sites within the adsorbent. The adsorbent was essentially totally ion-exchanged and contained a weight ratio of elemental barium over elemental potassium of about 4.6. A sample of the physical and chemical analysis of the adsorbent is given in Table I below.

TABLE I

Adsorbent analysis

Chemical: [1]
- Na, wt. percent _____ 0.72
- K, wt. percent _____ 4.2
- Ba, wt. percent _____ 19.2
- $SiO_2/Al_2O_3$ mole ratio _____ 2.32
- Loss on ignition at 500° C., wt. percent _____ 14.7

Physical:
- Surface area, m.$^2$/gm. _____ 415
- Pore volume, cc./gm. _____ 0.24
- Bulk density, gm./cc. _____ 0.835

[1] Based on volatile-free adsorbent.

EXAMPLE I

In this example, the adsorbent described in Table I was placed in the dynamic testing unit and was contacted with a feed mixture containing 5 volume percent each of meta-xylene, para-xylene and ethylbenzene in 2,3,4-trimethylpentane. The feed mixture was diluted to facilitate ease of chromatographic analysis. The desorbent stream was also diluted in aromatic components and contained 15 volume percent benzene in iso-octane (2,2,4-trimethylpentane). The feed and desorbent streams were alternately fed to the adsorbent chamber while the effluent streams were analyzed in a manner to determine the selectivity of the adsorbent for para-xylene as compared to the other $C_8$ aromatic components of the feed. By selective sampling of the streams leaving the adsorbent chamber, the adsorbed phase could be analyzed during desorption operations and using the definitions of selectivity given in Equation 1, the adsorbent selectively was determined.

The alternate passage of feed and desorbent through the adsorbent was controlled so that equilibrium adsorption operations took place. The feed did not contain any desorbent material and was passed through the adsorbent contained in the adsorbent chamber until the adsorbent was fully loaded with adsorbed material which displaced all of the desorbent previously present in the adsorbent from prior desorption operations. The feed was then desorbed with the benzene desorbent material. The alternate adsorption and desorption cycles were continued until reproducible results were obtained for the para-xylene selectivities. The results are shown in Table II below.

TABLE II

Equilibrium adsorption using benzene desorbent

Selectivity of adsorbent:
- B p-xylene/m-xylene _____ 3.75
- B p-xylene/ethylbenzene _____ 2.56

EXAMPLE II

The same desorbent material was used in this example as was used in Example I (15 vol. percent benzene in iso-octane). The feed material that was used in this example contained 5 volume percent benzene together with 5 volume percent each of para-xylene, meta-xylene and ethylbenzene, the remaining portion of the feed being iso-octane. The benzene was included in the feed stock to allow less than equilibrium adsorption operations to be effected. The adsorption operations took place in the presence of benzene and from reproducible selectivity data obtained, the benzene did adversely affect the adsorbent selectivity for para-xylene as shown by the results of Table III below.

TABLE III

Less than equilibrium adsorption using benzene desorbent

Selectivity of adsorbent:
- B p-xylene/m-xylene _____ 2.36
- B p-xylene/ethylbenzene _____ 1.24

In comparing the results of the adsorbent selectivity when using a benzene desorbent, it is apparent that less than equilibrium adsorption conditions, i.e. those conditions where desorbent is present during the entire adsorption operation, substantially reduce an adsorbent's ability to selectively adsorb para-xylene from a $C_8$ aromatic feed mixture. The selectivities for less than equilibrium adsorption operations where a benzene desorbent was used indicate over a 35% reduction in the para-xylene/meta-xylene selectivity and over a 50% reduction in the para-xylene/ethylbenzene selectivity.

EXAMPLE III

In this example a desorbent which contained 25 volume percent toluene in iso-octane was used. The feed stream employed contained 5 volume percent each of toluene, ortho-xylene, meta-xylene, para-xylene and ethylbenzene diluted in isooctane. The adsorption operations were effected to allow less than equilibrium adsorption operations to occur. The presence of the toluene desorbent during the adsorption of para-xylene from the feed did not reduce the selectivity of the adsorbent for para-xylene as is shown in Table IV below.

TABLE IV

Less than equilibrium adsorption using a toluene desorbent

Selectivity of the adsorbent:
- B p-xylene/m-xylene _____ 3.73
- B p-xylene/o-xylene _____ 3.45
- B p-xylene/ethylbenzene _____ 2.53

The selectivities presented in Table IV above are essentially identical to the same selectivities determined for equilibrium adsorption conditions using a benzene desorbent determined in Example I and shown in Table II.

EXAMPLE IV

In this example, less than equilibrium adsorption conditions were effected by employing a feed mixture containing 1 vol. percent benzene, 4 vol. percent toluene and 5 vol. percent each of ortho-xylene, para-xylene, meta-xylyene and ethylbenzene all diluted in iso-octane. The desorbent used contained 25 vol. percent toluene in iso-octane. The effects of the presence of benzene in the feed on the para-xylene/meta-xylene and para-xylene/ethylbnzene selectivities were noticeable as indicated in Table V below.

TABLE V

Less than equilibrium adsorption using a feed stream containing benzene and a toluene desorbent Adsorbent selectivity:
- B p-xylene/m-xylene _____ 3.04
- B p-xylene/o-xylene _____ 2.43
- B p-xylene/ethylbenzene _____ 1.58

All of the selectivities were substantially reduced when only 1 vol. percent benzene was in the feed stream when compared to the selectivities found in Example III, Table IV.

The operations of Examples III and IV were essentially the same except for the introduction of benzene into the feed stream in Example IV. The presence of benzene as indicated in comparing the data in Tables IV and V shows that benzene reduced the para-xylene/meta-xylene selectivity found in Example III by over 18% while reducing the para-xylene/ethylbenzene selectivity over 37% indicating a definite requirement that, at less than equilibrium adsorption operations, there be employed a toluene desorbent and not benzene.

The above examples were presented to further illustrate the benefits afforded through the use of the present invention and are not intended to limit the scope of the invention.

PREFERRED EMBODIMENT

A broad embodiment of this invention resides in an improved adsorptive-separation process for the separation of at least one $C_8$ aromatic isomer from a hydrocarbon feed containing a mixture of $C_8$ aromatic isomers, which process employs a crystalline aluminosilicate adsorbent selected from the group consisting of type X and type Y zeolites containing selected cations at the exchangeable cationic sites within said zeolite, said process comprising contacting said adsorbent with said hydrocarbon feed at adsorption conditions, adsorbing in the presence of desorbent material contacting said adsorbent a selectively adsorbed component of the feed within said adsorbent, withdrawing a stream comprising desorbent material and less selectivity adsorbed components of the feed, contacting said adsorbent with a desorbent material at desorption conditions to effect displacing said selectively adsorbed component of the feed from said adsorbent while withdrawing an extract stream comprising desorbent and said selectively adsorbed component of the feed, wherein the improvement comprises employing toluene as desorbent material.

I claim as my invention:

1. In an adsorptive-separation process for the separation of at least one $C_8$ aromatic isomer from a hydrocarbon feed comprising a mixture of $C_8$ aromatic isomers which process comprises the steps of:
   (a) contacting said hydrocarbon feed, at less than equilibrium adsorption conditions and in the simultaneous presence of a hereinafter specified desorbent material, with a bed of crystalline aluminosilicate adsorbent selected from the group consisting of type X and type Y zeolites containing selected cations at the exchangeable cationic sites within said zeolite, thereby adsorbing a selectively adsorbed component of the feed within said adsorbent, said less than equilibrium adsorption conditions being further characterized in allowing a competitive adsorption between said desorbent and said selectively adsorbed feed component for the adsorptive sites on the adsorbent whereby desorbent remains within the adsorbent for the duration of this step (a);
   (b) withdrawing from said bed of adsorbent a raffinate stream comprising desorbent material and less selectively adsorbed components of the feed;
   (c) contacting the adsorbent bed with said desorbent material at desorption conditions to effect displacing said selectively adsorbed component of the feed from said adsorbent; and
   (d) withdrawing from the adsorbent bed an extract stream comprising desorbent material and said selectively adsorbed component of the feed;
   the improvement which comprises employing toluene as said desorbent material.

2. The process of claim 1 further characterized in that said adsorbent contains at least one cation selected from the group consisting of lithium, sodium potassium, beryllium, magnesium, calcium, strontium, barium, nickel, copper, silver, manganese, and cadmium.

3. The process of claim 2 further characterized in that said adsorbent contains at least one cation selected from the group consisting of potassium, barium, sodium, and silver.

4. The process of claim 3 further characterized in that said selectively adsorbed component of the feed comprises para-xylene.

5. The process of claim 1 further characterized in that said selectively adsorbed component of said feed mixture comprises para-xylene.

6. The process of claim 5 further characterized in that said adsorbent contains at least one cation selected from the group consisting of potassium, barium, sodium, and silver.

7. The process of claim 5 further characterized in that said adsorbent contains pairs of cations selected from the group of cation pairs consisting of potassium and barium, potassium and beryllium, potassium and magnesium, rubidium and barium, cesium and barium, potassium and rubidium, and potassium and cesium.

8. The process of claim 7 further characterized in that said adsorbent is a type X zeolite containing barium and potassium cations in a weight ratio of barium over potassium included within the range from about 1 to about 10.

9. The process of claim 8 further characterized in that said adsorbent contains barium and potassium cations in a weight ratio of barium over potassium included within the range of from about 3 to about 7.

10. The process of claim 7 further characterized in that said adsorbent is a type Y zeolite containing barium and potassium cations in a weight ratio of barium over potassium included within the range of from about 1 to about 10.

11. The process of claim 10 further characterized in that said adsorbent contains barium and potassium cations in a weight ratio of barium over potassium included within the range of from about 3 to about 7.

12. In an adsorptive-separation process for the separation of para-xylene from a hydrocarbon feed stream comprising $C_8$ aromatic isomers including ethylbenzene, which process comprises the steps of:

(a) contacting said hydrocarbon feed, at less than equilibrium adsorption conditions and in the simultaneous presence of a hereinafter specified desorbent material, with a bed of crystalline aluminosilicate adsorbent selected from the group consisting of type X and type Y zeolites and containing at above about 70% of the exchangeable cationic sites within said zeolite at least one cation pair selected from the group of cation pairs consisting of potassium and barium, potassium and beryllium, potassium and magnesium, rubidium and barium, secium and barium, potassium and rubidium, and potassium and cesium, thereby adsorbing para-xylene within said adsorbent, said less than equilibrium adsorption conditions being further characterized in allowing a competitive adsorption between said desorbent and para-xylene for the adsorptive sites on the adsorbent whereby desorbent remains within the adsorbent for the duration of this step (a);

(b) withdrawing from said bed of adsorbent a raffinate stream comprising desorbent material and less selectively adsorbed components of the feed;

(c) contacting the adsorbent bed with said desorbent material at desorption conditions to effect displacing said adsorbed para-xylene from said adsorbent; and (d) withdrawing from the adsorbent bed an extract stream comprising desorbent material and para-xylene;

the improvement which comprises employing toluene as said desorbent material.

13. The process of claim 12 further characterized in that said adsorbent contains barium and potassium cations in a weight ratio of barium over potassium included within the range of from about 1 to about 10.

14. The process of claim 13 further characterized in that said adsorbent contains barium and potassium cations in a weight ratio of barium over potassium included within the range of from about 3 to about 7.

References Cited

UNITED STATES PATENTS

| | | | |
|---|---|---|---|
| 2,985,589 | 5/1961 | Broughton et al. | 210—34 |
| 2,882,243 | 4/1959 | Milton | 252—455 |
| 3,114,782 | 12/1963 | Fleck et al. | 260—674 |
| 3,126,425 | 3/1964 | Eberly et al. | 260—674 |
| 3,133,126 | 5/1964 | Fleck et al. | 260—674 |
| 3,130,007 | 4/1964 | Breck | 252—455 |

DELBERT E. GANTZ, Primary Examiner

C. E. SPRESSER, JR., Assistant Examiner

U.S. Cl. X.R.

208—310